United States Patent
Zhang et al.

(10) Patent No.: US 9,141,521 B2
(45) Date of Patent: Sep. 22, 2015

(54) METHOD AND APPARATUS FOR AUTOMATICALLY GENERATING A TEST SCRIPT FOR A GRAPHICAL USER INTERFACE

(71) Applicant: GE Medical Systems Global Technology Company, LLC, Waukesha, WI (US)

(72) Inventors: Yun Zhang, Beijing (CN); Jing Luo, Beijing (CN); Yuanji Wang, Beijing (CN)

(73) Assignee: GE Medical Systems Global Technology, LLC, Waukesha, WI (US)

( * ) Notice: Subject to any disclaimer, the term of this patent is extended or adjusted under 35 U.S.C. 154(b) by 104 days.

(21) Appl. No.: 13/851,783

(22) Filed: Mar. 27, 2013

(65) Prior Publication Data

US 2013/0262934 A1 Oct. 3, 2013

(30) Foreign Application Priority Data

Mar. 27, 2012 (CN) .......................... 2012 1 0102231

(51) Int. Cl.
*G06F 11/36* (2006.01)

(52) U.S. Cl.
CPC .................................. *G06F 11/3684* (2013.01)

(58) Field of Classification Search
CPC ............ G06F 11/3684; G06F 11/3672; G06F 11/3696; G06F 11/3668; G06F 9/4443; G06F 8/30
See application file for complete search history.

(56) References Cited

U.S. PATENT DOCUMENTS

| 7,165,240 | B2* | 1/2007 | Patterson | ....................... 717/116 |
| 7,454,660 | B1* | 11/2008 | Kolb et al. | ................. 714/38.14 |
| 2007/0234121 | A1* | 10/2007 | He et al. | ........................... 714/33 |
| 2008/0133472 | A1* | 6/2008 | Patterson | ........................... 707/3 |
| 2010/0281467 | A1* | 11/2010 | Arteaga et al. | ................. 717/126 |
| 2010/0325492 | A1* | 12/2010 | Isaacs et al. | ..................... 714/38 |
| 2014/0165040 | A1* | 6/2014 | Augustin et al. | .............. 717/124 |

FOREIGN PATENT DOCUMENTS

| EP | 0869433 A2 | 10/1998 |
| WO | 0002123 A1 | 1/2000 |

OTHER PUBLICATIONS

Ostrand T, et al: "A visual test development environment for GUI systems", Software Engineering Notes, ACM, New York, NY, US, vol. 23, issue 2, Mar. 1, 1998, pp. 82-92.
Search Report from NL Application No. 2010546 dated Jul. 3, 2013.

* cited by examiner

*Primary Examiner* — Nadeem Iqbal
(74) *Attorney, Agent, or Firm* — GE Global Patent Operation; Marc A. Vivenzio

(57) ABSTRACT

Embodiments of the present invention relate to the technical field of automatic testing of a graphical user interface in the technical field of software testing. Embodiments of the invention provide a method for automatically generating a test script for a graphical user interface. This method comprises defining information of each component in a tested graphical user interface, writing a test case file, and generating a file of combined values of components, and adding an operation type to each component in each file of combined values. The method further comprises determining a sequence of operations in each of the files of combined values, and generating a test script. This method reduces the tester's workload when manually programming test scripts and facilitates maintenance of test scripts.

5 Claims, 2 Drawing Sheets

METHOD AND APPARATUS FOR AUTOMATICALLY GENERATING A TEST SCRIPT FOR A GRAPHICAL USER INTERFACE

BACKGROUND OF THE INVENTION

Embodiments of the present invention relate to a software test. Further embodiments of the present invention automatically generate a test script for a graphical user interface.

When using the prior art automation test tools to perform an automation test on a graphical user interface (GUI), testers need to manually program the corresponding test scripts according to the requirement of the test case. These automation test tools per se are only capable of automatically running these programmed test scripts. For example, the Windows-based automation test tool Winrunner and the Linux-based automation test tool Xrunner both belong to these types of automation test tools. Such automation test tools have the problems. First, it is difficult to program the test scripts manually. Different automation test tools have different programming styles and grammars, so testers have to be familiar with how to program qualified test scripts. Moreover, different test cases need to include different test scripts. Second, it is difficult to maintain the test scripts. Once the tested graphical user interface changes, all the test scripts will have to be manually modified.

BRIEF DESCRIPTION OF THE INVENTION

Embodiments of the present invention relate to a method for automatically generating a test script for a graphical user interface. The method comprises defining information of at least one component in a tested graphical user interface; defining an attribute of each component and a mutual constraint relationship between the at least one component as defined; and writing a test case file, wherein values to be written into the at least one component in the tested graphical user interface and test check point information are stored in the file. The method further comprises generating a file of combined values with at least one component; combining values of the component in the test case file to obtain several files, each file containing one possible combination; and adding an operation type to each component in each file of combined values, wherein an operation type of each component value in the file of combined values according to the attribute of the component are determined. The method also comprises determining a sequence of operations in each of the files of combined values, wherein the sequence of operations in the files of combined values are arranged according to the mutually constraint relation between the components; and generating the test script, wherein the test check point information is added to the end of each file of combined values to obtain the test script file.

Embodiments of this invention further relate to an apparatus for automatically generating a test script for a graphical user interface. This apparatus comprises six modules. A first module is configured to define information of a component in a tested graphical user interface, wherein the first module is configured to define an attribute of the component and a mutual constraint relationship between the components. A second module for writing a test case file is configured to store values in the file to be written into each component in the tested graphical user interface and test check point information. A third module is provided for generating a file of combined values of the components, wherein the third module is configured to combine values of components in the test case file to obtain several files of combined values, each file containing one possible combination. A fourth module is provided for adding an operation type to each component value in each file of combined values, wherein the fourth module is configured to determine an operation type of each component value in the file of combined values according to the attribute of the component. A fifth module is provided that is configured to determine a sequence of operations in each of the files of combined values is provided and to rearrange the sequence of operations in the files of combined values according to the mutually constraint relation between the components. A sixth module is further provided and configured to generate a test script and to add the test check point info ion to the end of each file of combined values to obtain a test script file.

DETAILED DESCRIPTION OF THE INVENTION

Figure 1:
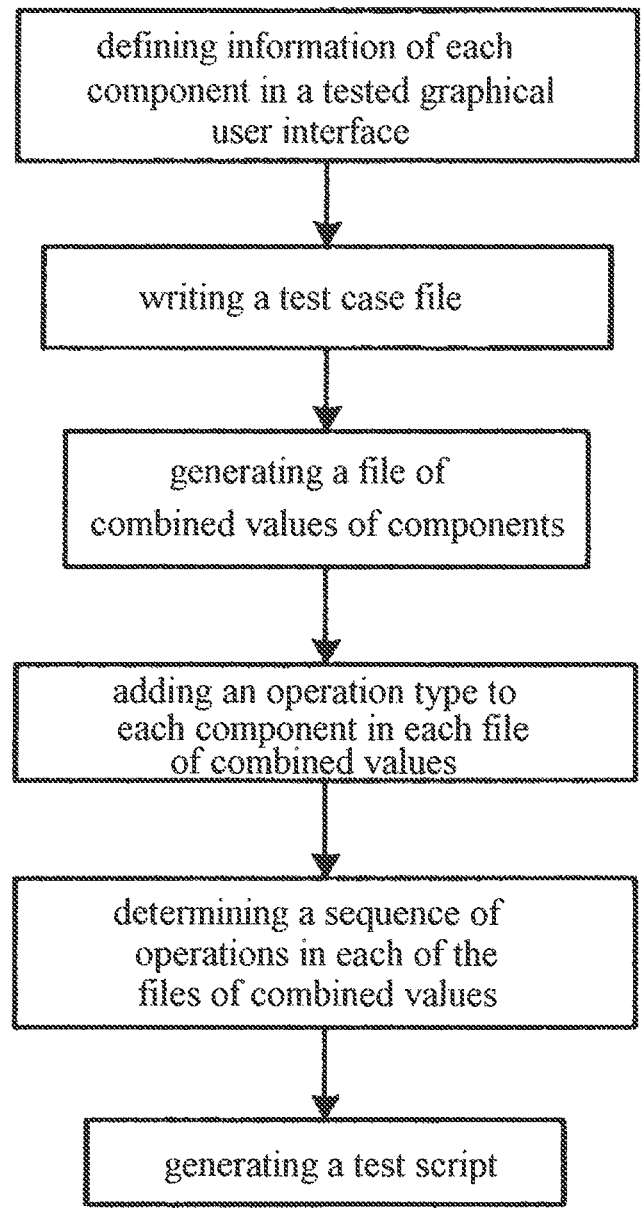
FIG. 1 is a general flow chart of a method for automatically generating a test script for a graphical user interface provided by an embodiment of the present invention.

Embodiments of the present invention provides a method and apparatus for automatically generating a test script for a graphical user interface, which addresses the problem in the prior art that testers need to manually program test scripts and can hardly maintain the test scripts.

An embodiment of the present invention provides a method for automatically generating a test script for a graphical user interface. The method comprises the following six stages. The first stage defines information of each component in a tested graphical user interface Then it defines an attribute of each component and a mutual constraint relation between said component and other components.

In the second stage a test case file is written storing values to be written into each component in the tested graphical user interface and test check point information in said file. In a third step, a file is generated with combined values of the components. By combining several values of all the components in the test file, several files a generated, one file per combination.

In a fourth stage, each file of combined values is supplemented with an operation type, that operation type is selected according to attributes of each component. In the fifth stage a sequence of operations performed upon the combined values is determined. The sequence of these values is then rearranged according to the mutual constrain relation between the components. In the sixth stage, a test script is generated by adding a test check point to the end of each file of combined values to obtain a test script file.

An embodiment of the present invention, provides a method for automatically generating a test script for a graphical user interface, a range of value of an attribute of each component forms a set, which includes operation types for the component.

An embodiment of the present invention, provides a method for automatically generating a test script for a graphical user interface, a range of value of the mutual constraint relation of each component forms a set, which includes input and output relations between the component and other components.

An embodiment of the present invention provides a method for automatically generating a test script for a graphical user interface, the information of each component further includes serial number, type and name of the component.

An embodiment of the present invention also provides an apparatus for automatically generating a test script for a graphical user interface, which comprises: a module for defining information of each component in a tested graphical user interface, which defines an attribute of each component and a mutual constraint relation between the component and other components; a module for writing a test case file, which stores values to be written into each component in the tested graphical user interface and test check point information in said file; a module for generating a file of combined values of components, which combines values of all components in the test case file to obtain several files of combined values, each file containing one possible combination; a module for adding an operation type to each component value in each file of combined values, which determines an operation type of each component value in the file of combined values according to the attribute of the component; a module for determining a sequence of operations in each of the files of combined values, which rearranges the sequence of operations in the files of combined values according to the mutually constraint relation between the components; and a module for generating a test script, which adds test check point information to the end of each file of combined values to obtain a test script file.

When using the prior art automation test tools to perform an automation test on a graphical user interface (GUI), testers need to manually program the corresponding test scripts according to the requirement of the test case. These automation test tools per se are only capable of automatically running these programmed test scripts. For example, the Windows-based automation test tool Winrunner and the Linux-based automation test tool Xrunner both belong to these types of automation test tools. Such automation test tools have the problems. First, it is difficult to program the test scripts manually. Different automation test tools have different programming styles and grammars, so testers have to be familiar with how to program qualified test scripts. Moreover, different test cases need to include different test scripts. Second, it is difficult to maintain the test scripts. Once the tested graphical user interface changes, all the test scripts will have to be manually modified.

Compared to the prior art, the method and apparatus for automatically generating a test script for a graphical user interface provided in the present invention achieves advantageous technical effect: First, the embodiments of the present invention reduce the testers workload of manually programming test scripts. Since test script files can be automatically generated according to the test case files, it is no longer necessary for testers to know the convention for programming test scripts. Second, embodiments of the invention facilitate maintenance of test scripts. Once the tested graphical user interface changes, new test script files can be regenerated automatically only by modifying the test case files.

Figures 2, 3:
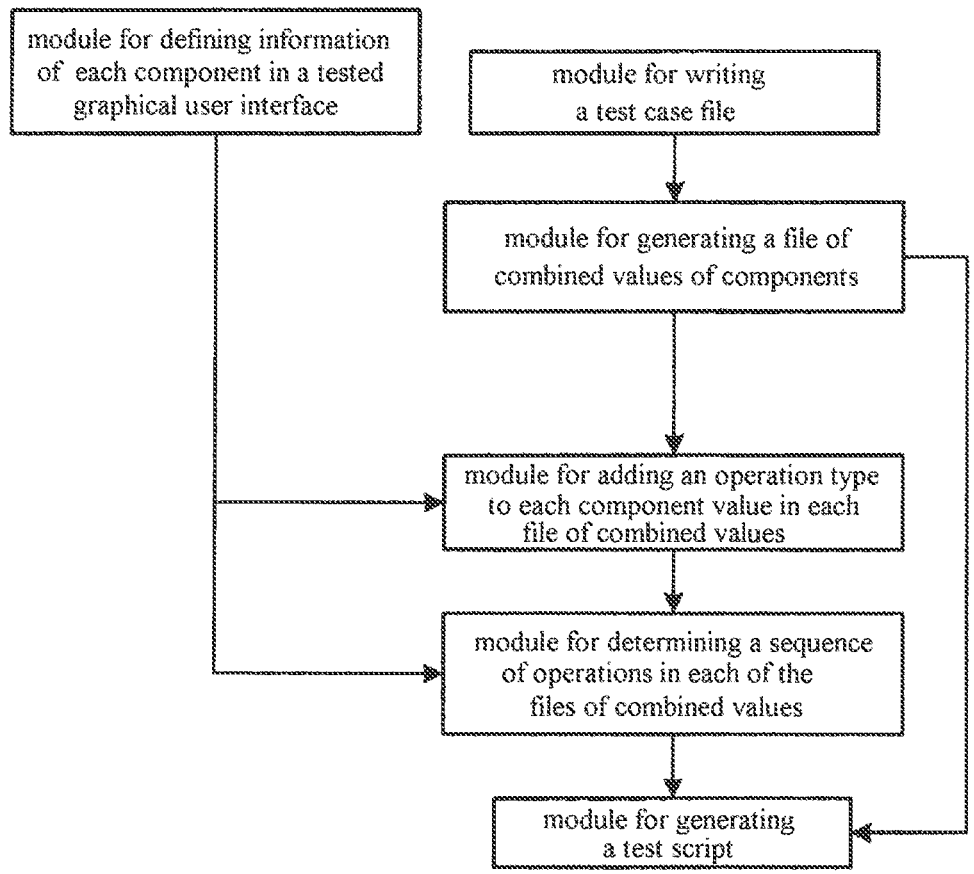
FIG. 2 is a schematic block diagram of an apparatus for automatically generating a test script for a graphical user interface provided by an embodiment of the present invention.
FIG. 3 is a schematic drawing of a tested graphical user interface in a specific embodiment of the present invention.

In an embodiment, a graphical user interface shown in FIG. 3 is tested.

Step 1: Defining information of each component in the tested graphical user interface in the following format:

W={id, type, name, attribute, constraint} wherein, id is the serial number of the component; type is the type of the component, such as text box, button, pull-down box, etc.; name is the name of the component; attribute is the attribute of the component, whose range of value is a set describing all possible operation types for the component, such as insertion, deletion, clicking, selection; constraint is the constraint relation between the component and other components, for example, a relation describing that the component is an input of another component.

It can be seen from FIG. 3 that the graphical user interface includes four components altogether, which are "Amount", "Rate", "Term" and "Calculate". For each component, the information thereof is defined according to the above-mentioned format as follows:

W1={id1, textbox, Amount, insert/delete, w1→w4}
W2={id2, textbox, Rate, insert/delete, w2→w4}
W3={id3, pull-down box, Term, select, w3→w4}
W4={id4, button, Calculate, click, w4→Window2} wherein w1→w4, w2→w4, and w3→w4 mean that w1, w2 and w3 are inputs of w4 respectively; w4→Window2 means that w4 is outputted to another window, i.e. Window2, and contents displayed in Window2.

Step 2: writing a test case file, which includes the following information:

W1: 21, 0, −999
W2: 1.0, 6.48
W3: 1, 2, 3
W4: click, double click
Check Window2

In the test case file, values for each component form a line, which include values to be written into each of the components in the tested graphical user interface during the test, and the last line of the test case file specifies check point information of the test case.

Step 3: Generating a file of combined values of the components. The component values in the test case file in step 2 are combined, and each possible combination is a file of combinations of component values. Examples of some of the combinations are as follows:

Combined Value File 1:
w1 21
w2 1.0
w3 1
w4 click

Combined Value File 2:
w1 0
w2 1.0
w3 1
w4 click

Combined Value File 3
w1 −999
w2 1.0
w3 1
w4 click

Combined Value File 4:
w1 −999
w2 6.48
w3 3
w4 double click

Step 4: Determining an operation type of each component value in each file of combined values. An operation type of each component value in the file of combined values is determined according to the attribute of the component defined in Step 1, and then added to the file of combined values. The file of combined values having the operation type added thereto is as follows:

Combined Value File 1
insert w1 21
insert w2 1.0
select w3 click w4 click
Combined Value File 2:
insert w1 0
insert w2 1.0
select w3 1
click w4 click
Combined Value File 3:
insert w1 −999
insert w2 1.0
select w3 1
click w4 click
Combined Value File 4:
insert w1 −999
insert w2 6.48
select w3 3
click w4 double click Step 5: Determining a sequence of the operations and values in each file. According to the constraint relation between components defined in Step 1, the outputs of w1, w2 and w3 are necessary inputs for w4, so corresponding operations for w1, w2 and w3 should be performed before operation of w4. Therefore, this rule should guide the re-ordering of the operations of the file of combined values obtained in Step 4. In this embodiment, before the re-ordering, the sequence of operations in the file of combined values happens to meet the requirement of this rule, so the sequence remains unchanged after the re-ordering.

Step 6: Generating test scripts. The test check point information in the test case file written in Step 2 is added to the end of each of the files of combined values obtained in Step 5 so as to obtain test script files as follows:

Test Script File 1:
insert w1 21
insert w2 1.0
select w3 1
click w4 click
check Window2
Test Script File 2:
insert w1 0
insert w2 1.0
select w3 1
click w4 click
check Window2
Test Script File 3:
insert w1 −999
insert w2 1.0
select w3 1
click w4 click
check Window2
Test Script File 4:
insert w1 −999
insert w2 6.48
select w3 3
click w4 double click
check Window2

It can be seen from the above descriptions that the information defined in Step 1 is provided for the developer and designer of the graphical user interface, and only the second step should be written by testers of the graphical user interface, which does not involve large workload. The next few steps that involve larger workload can be performed automatically by a computer. When any modification is made to the tested graphical user interface and a test has to be made again, the test case file should be modified, and then the next four steps can be performed automatically by a computer so as to quickly generate the needed new test script.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for automatically generating a test script for a graphical user interface, the method comprising:
   defining information of each at least one component in a tested graphical user interface, wherein an attribute of each component and a mutual constraint relationship for the at least one component is defined;
   writing a test case file, wherein values to be written into the at least one component in the tested graphical user interface and test check point information are stored in the said file;
   generating a file of combined values of the at least one component, wherein values of the component in the test case file are combined to obtain several files, each file containing one possible combination;
   adding an operation type to each component in each file of combined values, wherein an operation type of each component value in the file of combined values is determined according to the attribute of the component;
   determining a sequence of operations in each of the files of combined values, wherein the sequence of operations in the files of combined values are rearranged according to the mutual constraint relationship for the components; and
   generating the test script, wherein the test check point information is added to the end of each file of combined values to obtain the test script file.

2. The method according to claim 1, wherein a range of values of the attributes of each component forms a set, the set includes operation types for the component.

3. The method according to claim 1, wherein a range of values of the mutual constraint relationship of each component forms a set, the set includes input and output relationships between said the components.

4. The method according to claim 1, wherein the information of each component further includes a serial number, a type and a name of the component.

5. An apparatus for automatically generating a test script for a graphical user interface, comprising:
   a first module configured to define information of at least one component in a tested graphical user interface, wherein the first module is further configured to define an attribute of the component and a mutual constraint relationship for the component;
   a second module for writing a test case file, wherein the second module is configured to store in the file values to be written into each component in the tested graphical user interface and test check point information;
   a third module for generating a file of combined values of the components, wherein the third module is configured to combine values of all components in the test case file to obtain several files of combined values, each file containing one possible combination;
   a fourth module for adding an operation type to each component value in each file of combined values, wherein the fourth module is configured to determine an operation type of each component value in the file of combined values according to the attribute of the component;

a fifth module configured to determine a sequence of operations in each of the files of combined values, wherein the fifth module is further configured to rearrange the sequence of operations in the files of combined values according to the mutual constraint relation for the components; and a sixth module configured to generate a test script, wherein the sixth module is further configured to adds the test check point information to the end of each file of combined values to obtain a test script file.

* * * * *